May 21, 1935.  E. S. CORNELL, JR  2,002,470
METHOD OF MAKING ELBOW PIPE FITTINGS OF INTEGRAL TUBULAR METAL
Filed Jan. 16, 1932  2 Sheets-Sheet 1

INVENTOR.
EDWARD S. CORNELL, JR.
BY
HIS ATTORNEY

May 21, 1935.   E. S. CORNELL, JR   2,002,470
METHOD OF MAKING ELBOW PIPE FITTINGS OF INTEGRAL TUBULAR METAL
Filed Jan. 16, 1932   2 Sheets-Sheet 2
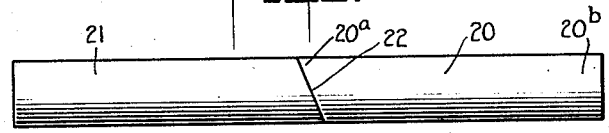
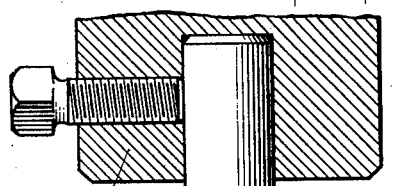
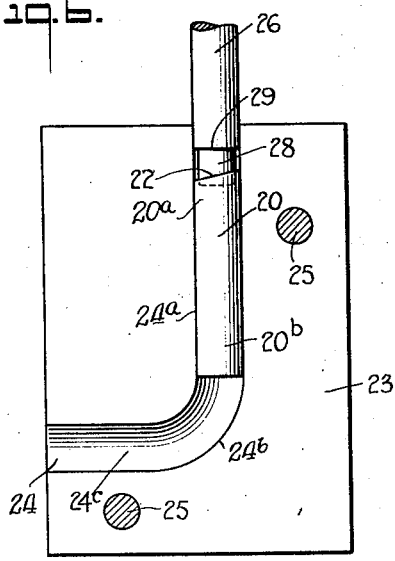
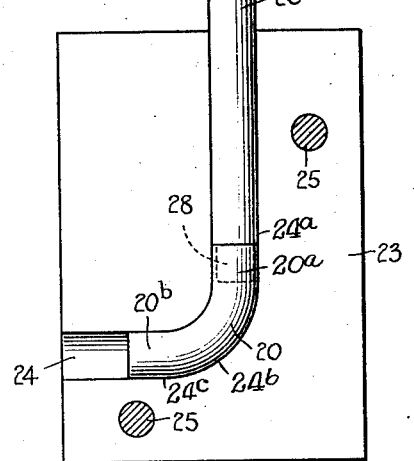
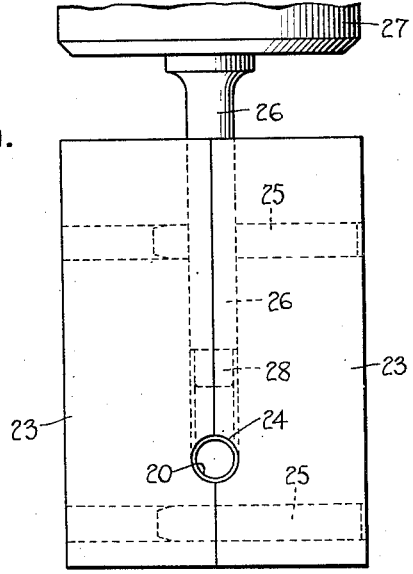
INVENTOR,
EDWARD S. CORNELL, JR.
BY
HIS ATTORNEY Patented May 21, 1935

2,002,470

UNITED STATES PATENT OFFICE 2,002,470

METHOD OF MAKING ELBOW PIPE FITTINGS OF INTEGRAL TUBULAR METAL

Edward S. Cornell, Jr., Larchmont, N. Y., assignor to American Radiator & Standard Sanitary Corporation, New York, N. Y., a corporation of Delaware Application January 16, 1932, Serial No. 586,981

2 Claims. (Cl. 29—157)

This invention relates to a process of making elbow pipe fittings of integral metallic construction and the method of producing the same.

My invention relates to a process of making elbow pipe fittings of 45 to 90 degrees and other angular relationship, which are formed of integral metal.

Elbow pipe fittings made by my process may have their ends of uniform or non-uniform diameter with respect to the ends to one another and with respect to the body portion.

Preferably, the wall thickness of elbow pipe fittings embodying my invention is of uniform dimension.

The preferred process for forming elbow pipe fittings embodying my invention comprises forming the elbow of tubular, that is, wrought stock, the tube length having a component cylindrical element at one side greater than at the other, the material at the greater side serving to flow, i. e. constitute the material for the portion of the "outer radius" of the resulting elbow, whereby the wall thickness of the resulting elbow is substantially uniform.

By the term "elbow pipe fitting" as is set forth in the herein disclosure, inclusive of the showings of the accompanying drawings, I define a fitting having both of its terminal portions extending substantially rectilinearly, the portion of the fitting intermediate its ends being arcuate to the desired angular degree. Each such rectilinearly extending end of elbow pipe fittings embodying my invention, irrespective of its diameter relative to the diameter of the intermediate or arcuate portion of the fitting, is provided with a face, either interior or exterior, which is substantially smooth and of substantially uniform diameter and dimensioned relative to the diameter of the end of a pipe or other pipe fitting to provide a clearance of a magnitude effecting capillary and/or surface flow of the bonding medium when heated, which bonding medium when cooled affords a sweated self-sealed joint with the end of the pipe or other pipe fitting, as is set forth in my application Ser. #555,031, filed August 4, 1931.

Preferably, also as is set forth in my application Ser. #555,031, filed August 4, 1931, the wall thickness of elbows embodying my invention is of the magnitude of several hundredths of an inch to provide sufficient strength against puncture or other rupture, but preferably of insufficient thickness for forming a thread or like sealing joint.

Further features and objects of the invention will be more fully understood from the following detail description and the accompanying drawings, in which Fig. 1 is a side elevation of an elbow, partly broken away in vertical central section, embodying my invention, the ends being shown of substantially uniform enlarged inner and outer diameters;

Fig. 5 is a side elevation illustrating an initial step of my process, namely, of cutting a given pipe length into two component sub-lengths;

Fig. 6 is a central vertical elevation illustrating a stage of bending a component pipe length to a desired angular relationship, in this instance, 90 angular degrees;

Fig. 7 is a vertical central elevation showing a final stage of bending; and

Fig. 8 is an end view of Fig. 7.

Figure 2:
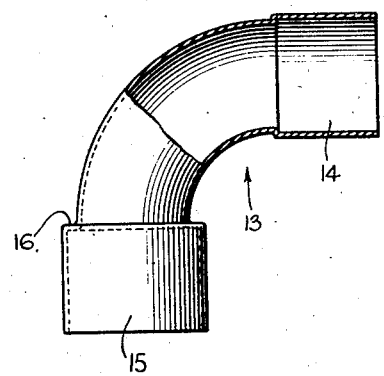
Fig. 2 is a side elevation partly broken away in vertical central section of a 90° elbow, embodying my invention, the inner and outer diameters of its ends being of different dimension.

Referring to the drawings, the elbow 10 illustrated in Fig. 2, is of so-called 90 angular degrees. Its body portion is of integral wrought material, preferably copper, brass or other copper-containing metallic material, but may be made of other metals. Its end 11, integral with the body portion, is shown of expanded diameter as compared with that of its body portion, but the end 11 may be of the same diameter as the body portion. The end 12, integral with the body portion, is shown of expanded diameter, and in this instance, the same diameter as that of the end 11. However, the diameter of the end 12 may be uniform with that of the body portion of the elbow.

The elbow 13 shown in Fig. 2 is also of 90 angular degrees, its end 14, integral with the body portion, being of expanded diameter, is shown somewhat larger than the diameter of the body portion. The end 15, integral with the body portion, is shown of greatly expanded diameter, that is to say, the diameter of the end 15 exceeds that of the end 14.

Figure 1:
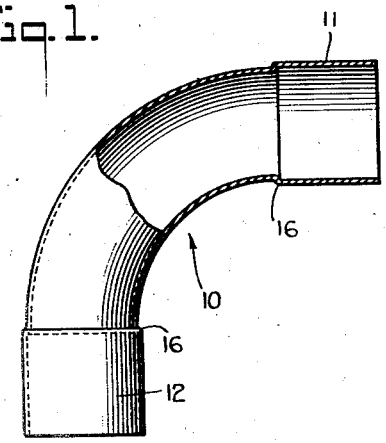
Figure 3:
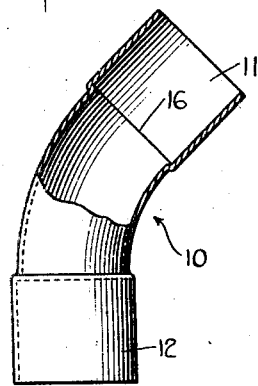
Fig. 3 is a side elevation of an elbow of 45° broken away in central sectional elevation, embodying my invention, the inner and outer dimensions of the enlarged ends being substantially uniform.

The elbow shown in Fig. 3 conforms largely to that shown in Fig. 1, excepting that of its angular degree; like parts are designated by like reference characters. The elbow shown in Fig. 3 is approximately of 45 angular degrees. Any desired angular degree may be selected.

Figure 4:
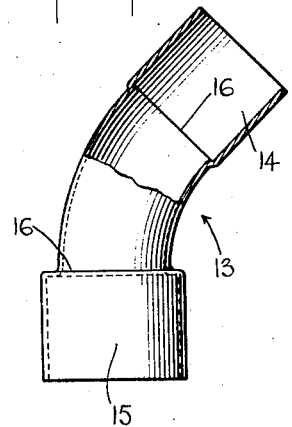
Fig. 4 is a side elevation of a 45° elbow, partly broken away in vertical central elevation, the inner and outer diameters of the ends being of different dimension.

The elbow shown in Fig. 4 is similar to that shown in Fig. 2, excepting for its angular degrees; like parts are designated by like reference characters. The elbow illustrated in Fig. 4 is approximately of 45 angular degrees. Any desired angular degree may be selected.

In the respective elbows illustrated in Fig. 1 to 4, limitation is provided for the extent of overlapping relationship of each elbow end with the end of a pipe, pipe fitting and the like, namely, in the form of an offset 16. Such offset is preferably formed "as of a radius", that is to say, its inner face being an arc of a circle; however, the resulting offset with metals such as copper, brass and other copper containing alloys and other suitable metallic materials, is substantially right angular in configuration to facilitate the function of positive limitation of telescoped overlapping.

Figs. 5 to 8, both inclusive, illustrate successive stages of my process of forming elbows, the angular degree of the elbow being indicated as ninety; it is understood, however, that the process is correspondingly applicable for elbows of other angular degrees.

For economy in material, see Fig. 5, the elbows are made from complementally severed pipe lengths 20, 21, severed at 22 of a given pipe length, at an angle, the angle being dependent upon the angular degree of the resulting elbow. By cutting a given pipe length for complemental sub-lengths, wastage of material is avoided.

A pipe length 20 is then placed in a forming die 23, see Fig. 6, having its channel 24 shaped in correspondence to the angular degree of the resulting elbow, the die 23 being preferably formed of complemental side-by-side half parts 23, 23, see Fig. 8, secured to one another by locking pins 25, or equivalent, and held rigidly in face-to-face engagement during the stage of operation of the punch 26 carried by the press head 27.

The swaging punch 26 is provided with a pilot 28, of reduced diameter as compared with the body portion of the punch, thereby providing an annular horizontal effective face 29, the pilot 28 entering the bore of the pipe length 20 and the swaging effective face 29 engaging the juxtaposed upper edge of the pipe length.

The derived sub-pipe length 20 is placed within the channel 24 of the die blocks 23, 23, the angularly severed end portion 22 being disposed at the upper end of the channel 24, the pipe length being positioned in the angular channel 24 to locate the longer side wall portion of the pipe length 20 along the side of the channel having the greater length; as viewed in Figs. 6 and 7, the longer side wall of the tubular element is placed toward the right-hand side of the channel 24. The reduced end 28 of the swaging punch 26 fits the end of the sub-pipe length 20, and upon operating the press the active pressure applied solely at the end of the pipe length 20 by the punch 26 forces the pipe length inwardly within the channel and into its angular portion, resulting in an elbow of the desired angular relationship, having the desired and uniform wall thickness, and free from wrinkles and other non-uniform surface characteristics. It will be observed that the bore of the channel 24 is clear throughout its rectilinear and angular portions; the bore of the channel 24 is devoid of fixed cores or other fixed or displaced instrumentalities disposed in and/or projecting into or displaced within the bore of the channel pursuant to prior art practice.

It will be observed that the channel 24 of the die comprises at its effective portion an arcuate portion 24b corresponding in angular degree to the degree of the desired elbow fitting; such channel 24 further comprises a portion 24c posterior to the arcuate portion 24b, which posterior channel portion 24c is substantially rectilinear. The interior, i. e., entrance portion 24a of the channel of the die is substantially straight.

It will be further observed that my method of producing elbow pipe fittings is carried out in the absence of supplied heat, particularly effective for elbow pipe fittings predominately of copper content.

Accordingly, upon insertion of the length of tubing 23 within the entrance portion 24a of the channel of the die, the leading portion 20b of the tube is subjected firstly to arcuate bending in its transit through the arcuate channel portion 24b and then to forces tending to and effecting a rectilinear extension of the leading portion 20b of the tube, effected by the walls of the posterior channel portion 24b.

From the above, it appears that my invention is particularly applicable to the production of elbow pipe fittings, preferably having a wall thickness insufficient to bear threading, comprising an arcuate body portion of the desired angular degree and having both of its ends extending rectilinearly, each end having a substantially smooth face of substantially uniform diameter for affording a telescoped connection with the end of a pipe or of another fitting by soldered, i. e. sweated connection therewith.

By such operation, the excess angular material 20a is utilized for the greater arcuate portion of the resulting elbow, i. e., over the areas having the greater radii.

The resulting formed articles are trimmed if necessary, and formed with enlarged diameter ends, and also provided with offsets 16 at the respective ends.

Whereas I have described my invention by specific reference thereto, it will be understood that many changes and modifications may be made without departing from the spirit of the invention.

I claim:

1. The method of forming an elbow pipe fitting of integral wrought metal having a wall thickness incapable of forming a thread, which comprises taking a substantially rectilinear tubular length of integral wrought metal having a wall thickness incapable of forming a thread, placing the same in a forming die having a channel comprising an arcuate channel portion corresponding to the angular degree of the degree of the desired elbow pipe fitting, said channel further having channel portions respectively anterior to and posterior of and directly communicating with the stated arcuate channel portion, applying active pressure solely endwise at the edge of the anterior portion of the tubular length, and subjecting the posterior portion of the tubular length firstly to arcuate bending and subsequently to rectilinear configuration and the intermediate portion of the tubular length to arcuate bending solely by the action of the walls of the stated arcuate and posterior portions of the channel conjointly with the stated applied active pressure, the aforesaid being effected in the absence of supplied heating.

2. The method of forming an elbow pipe fitting of integral wrought metal predominately of copper content having a wall thickness incapable of forming a thread, which comprises taking a substantially rectilinear tubular length of integral wrought metal predominately of copper content having a wall thickness incapable of forming a thread, placing the same in a forming die having a channel comprising an arcuate channel portion corresponding to the angular degree of the degree of the desired elbow pipe fitting, said channel further having channel portions respectively anterior to and posterior of and directly communicating with the stated arcuate channel portion, applying active pressure solely endwise at the edge of the anterior portion of the tubular length, and subjecting the posterior portion of the tubular length firstly to arcuate bending and subsequently to rectilinear configuration and the intermediate portion of the tubular length to arcuate bending solely by the action of the walls of the stated arcuate and posterior portions of the channel conjointly with the stated applied active pressure, the aforesaid being effected in the absence of supplied heating.

EDWARD S. CORNELL, Jr.